United States Patent
Mikura

(10) Patent No.: US 9,656,718 B2
(45) Date of Patent: May 23, 2017

(54) SADDLE RIDING TYPE VEHICLE

(71) Applicant: HONDA MOTOR CO., LTD., Tokyo (JP)

(72) Inventor: Keita Mikura, Wako (JP)

(73) Assignee: HONDA MOTOR CO., LTD., tok (JP)

( * ) Notice: Subject to any disclaimer, the term of this patent is extended or adjusted under 35 U.S.C. 154(b) by 0 days.

(21) Appl. No.: 15/068,114

(22) Filed: Mar. 11, 2016

(65) Prior Publication Data

US 2016/0280310 A1    Sep. 29, 2016

(30) Foreign Application Priority Data

Mar. 27, 2015    (JP) ................. 2015-066973

(51) Int. Cl.
| | |
|---|---|
| *B60R 22/00* | (2006.01) |
| *B62K 23/02* | (2006.01) |
| *B62J 99/00* | (2009.01) |
| *B62K 11/02* | (2006.01) |

(52) U.S. Cl.
CPC ........... *B62K 23/02* (2013.01); *B62J 99/00* (2013.01); *B62K 11/02* (2013.01); *B62J 2099/0013* (2013.01); *B62J 2099/0026* (2013.01)

(58) Field of Classification Search
CPC . B62K 23/02; B62J 99/00; B62D 6/00; B60R 16/037
USPC ............. 701/36, 38, 48, 49; 280/279, 284
See application file for complete search history.

(56) References Cited

U.S. PATENT DOCUMENTS

| | | | |
|---|---|---|---|
| 9,283,823 B2* | 3/2016 | LeClerc | B60G 11/58 |
| 9,308,879 B2* | 4/2016 | Wright | B60R 16/037 |
| 2009/0171546 A1* | 7/2009 | Tozuka | B60K 31/04 |
| | | | 701/93 |

FOREIGN PATENT DOCUMENTS

JP    62-128850 A    6/1987

OTHER PUBLICATIONS

Riders Manual K 1600 GTL, Dec. 2010, BMW Motorrad, 1st edition.*

* cited by examiner

*Primary Examiner* — Thomas G Black
*Assistant Examiner* — Luke Huynh
(74) *Attorney, Agent, or Firm* — Chip Law Group

(57) ABSTRACT

A motorcycle having an adjusting mechanism that allows a user to change the setting of at least a part forming a vehicle body by performing adjusting operation on the adjusting mechanism includes: a storage unit configured to store at least a plurality of pieces of adjustment information related to degrees of adjusting operation on the adjusting mechanism; a receiving unit configured to receive a request based on an input operation of the user; a selecting unit configured to select adjustment information corresponding to the request received by the receiving unit from the plurality of pieces of adjustment information in the storage unit; and an indicating unit configured to indicate the adjustment information selected by the selecting unit to the user.

14 Claims, 18 Drawing Sheets

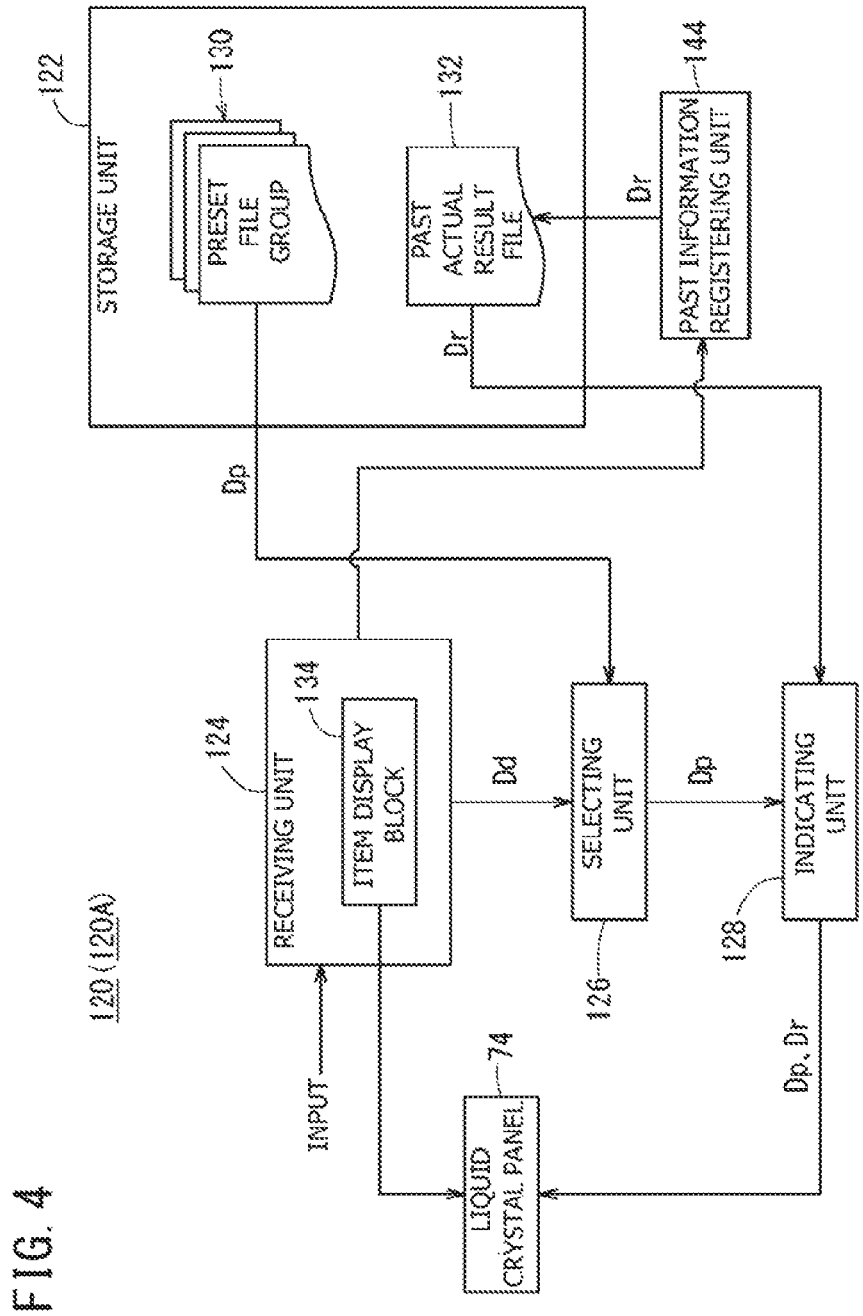

FIG. 5

| 1. WEIGHT OF DRIVER | 2. NUMBER OF OCCUPANTS | 3. TRAVELING AREA | 4. ROAD SURFACE |
|---|---|---|---|
| 41~60kg | RIDING BY ONE PERSON | CIRCUIT RACECOURSE | DRY |
| 61~80kg | RIDING BY TWO PERSONS | MOUNTAIN PASS | WET |
| 81~100kg | | URBAN AREA | |

F I G. 6

| | | | |
|---|---|---|---|
| 1. FRONT FORK | | | 142A |
| PRESENT SETTING | | RECOMMENDED SETTING | SETTING MADE THIS TIME |
| TEN | 4/10 | TEN 5/10 | TEN 5/10 |
| COM | 3/10 | COM 3/10 | COM 3/10 |
| SPRG | 6/15 | SPRG 5/15 | SPRG 4/15 |
| 2. REAR SUSPENSION | | | 142B |
| PRESENT SETTING | | RECOMMENDED SETTING | SETTING MADE THIS TIME |
| TEN | 4/10 | TEN 3/10 | TEN 3/10 |
| COM | 5/10 | COM 5/10 | COM 5/10 |
| SPRG | 4/15 | SPRG 5/15 | SPRG 5/15 |
| 3. WINDSHIELD SCREEN | | | 142C |
| PRESENT SETTING | | RECOMMENDED SETTING | SETTING MADE THIS TIME |
| 2/4 | | 1/4 | 1/4 |
| 4. REAR CUSHION | | | 142D |
| PRESENT SETTING | | RECOMMENDED SETTING | SETTING MADE THIS TIME |
| TEN | 3/10 | TEN 3/10 | TEN 3/10 |
| COM | 4/10 | COM 5/10 | COM 5/10 |
| 5. DRIVER SEAT | | | 142E |
| PRESENT SETTING | | RECOMMENDED SETTING | SETTING MADE THIS TIME |
| 1 | | 2 | 2 |

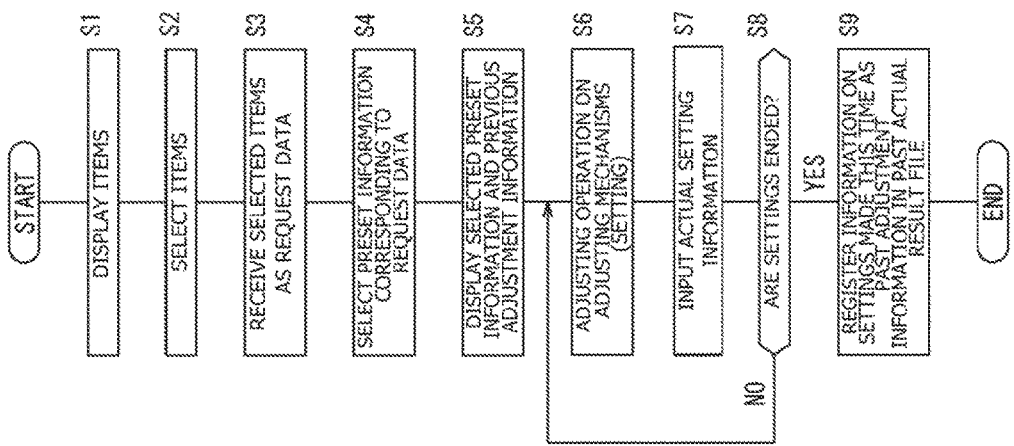

FIG. 18A
FIG. 18B
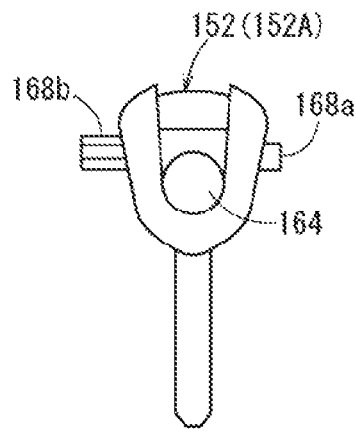
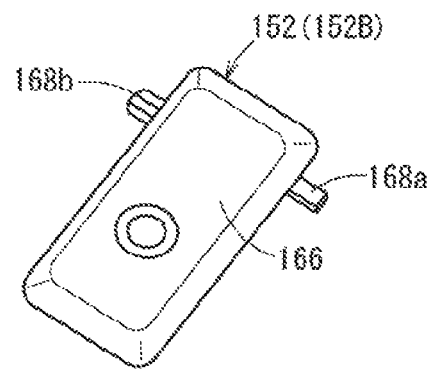
FIG. 18C
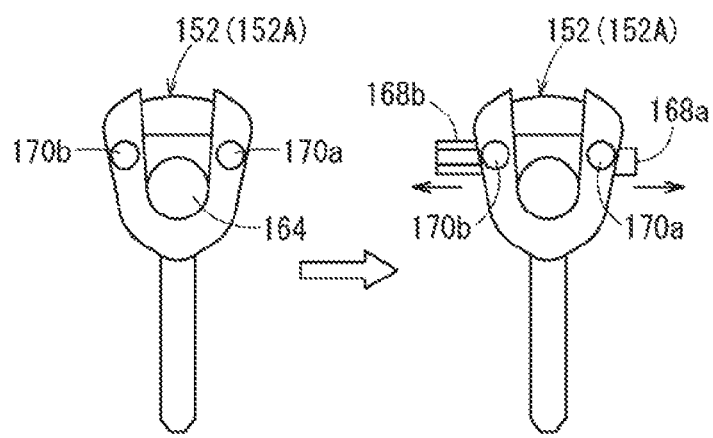
FIG. 18D
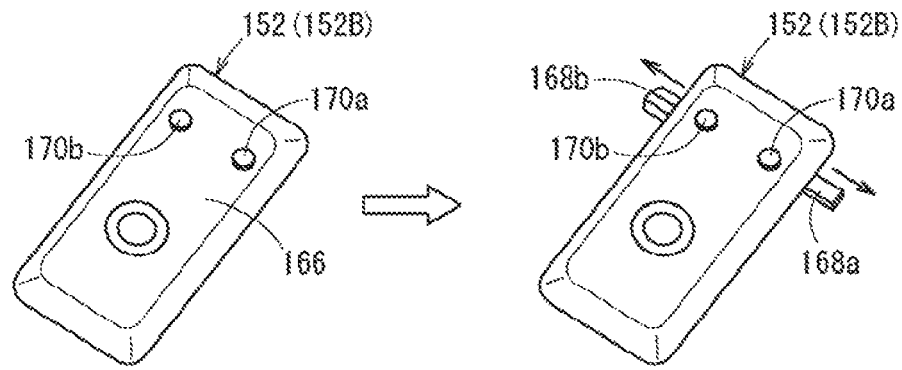

SADDLE RIDING TYPE VEHICLE

CROSS REFERENCE TO RELATED APPLICATIONS

This application claims the benefit of Japanese Priority Patent Application JP 2015-066973 filed on Mar. 27, 2015, the entire contents of which are incorporated herein by reference.

TECHNICAL FIELD

The present application relates to a saddle riding type vehicle having an adjusting mechanism that allows a user to change the set state of at least a part forming a vehicle body, such for example as a front fork, a suspension, a rear cushion, or the like, by performing adjusting operation on the adjusting mechanism.

BACKGROUND ART

A conventional system in a four-wheeled vehicle is disclosed which loads an IC card storing user setting information (setting information) into the vehicle, and which adjusts a seat position, a mirror position, and a handlebar position according to the setting information by driving a servomotor or the like (see Patent Document 1).

PRIOR ART DOCUMENT

Patent Document

[Patent Document 1]
Japanese Patent Laid-Open No. 1987-128850

SUMMARY OF THE APPLICATION

On the other hand, a saddle riding type vehicle has parts such as a suspension, a rearview mirror, a windshield screen, and the like at positions accessible by a hand of a user. The user can manually adjust the damping force, positions, and the like of these parts according to the number of occupants, a traveling road, and the like. These adjustments are usually made by performing adjusting operation on an adjusting mechanism installed for each of the parts.

In the present situation, however, the user does not know degrees to which the adjusting operation is to be performed when adjusting the positions and the like of the above-described parts by the adjusting mechanisms, and the user has to rely on long experience.

The present application has been made in consideration of such problem, and it is an object of the present application to provide a saddle riding type vehicle that, while achieving a weight reduction by not including a driving source such as a servomotor or the like, can indicate a degree of adjusting operation on an adjusting mechanism, which degree of adjusting operation corresponds to a request of a user, as adjustment information to the user so that any user can change the set state of a part forming a vehicle body to an optimum set state corresponding to a request.

The present embodiment has the following features.

First feature: a saddle riding type vehicle includes: a vehicle body (31); a front wheel (WF) and a rear wheel (WR) installed in the vehicle body (31); a power source (22) configured to drive at least the rear wheel (WR); an adjusting mechanism (100A to 100G) configured to allow a user to change a setting of at least a part forming the vehicle body (31) by performing adjusting operation on the adjusting mechanism; a storage unit (122) storing at least a plurality of pieces of adjustment information related to degrees of adjusting operation on the adjusting mechanism (100A to 100G); a receiving unit (124) configured to receive a request based on an input operation of the user; a selecting unit (126) configured to select adjustment information corresponding to the request received by the receiving unit (124) from the plurality of pieces of adjustment information in the storage unit (122); and an indicating unit (128) configured to indicate the adjustment information selected by the selecting unit (126) to the user.

Second feature: the saddle riding type vehicle in the first feature may further include a past information registering unit (144) configured to register adjustment information related to a degree of adjusting operation performed on the adjusting mechanism (100A to 100G) in a past as past adjustment information in the storage unit (122), wherein the indicating unit (128) may indicate, to the user, a difference (ΔD) between the degree of adjusting operation indicated by the past adjustment information and a degree of adjusting operation indicated by the adjustment information selected by the selecting unit (126) this time.

Third feature: in the first feature, the vehicle body (31) may include a display device (74) configured to display information, the saddle riding type vehicle may further include a history information registering unit (148) configured to associate the adjustment information selected by the selecting unit (126) with at least date and time information, and register the adjustment information associated with the at least date and time information as history information (Dh) in the storage unit (122), and when the user selects the history information (Dh) displayed on the display device (74) by the input operation, the receiving unit (124) may receive the selected history information (Dh) as the request.

Fourth feature: in the first to third features, the vehicle body (31) may include a display device (74) configured to display information, the receiving unit (124) may include an item display block (134) configured to display an item related to a change in a set state of the part forming the vehicle body (31) on the display device (74), and when the user selects the item displayed on the display device (74) by the input operation, the receiving unit (124) may receive the selected item as the request.

Fifth feature: in the first to fourth features, the saddle riding type vehicle may further include an authenticating unit (154) configured to authenticate the saddle riding type vehicle (10) and a key (152) carried by the user when the key (152) and the saddle riding type vehicle (10) are within a predetermined range, wherein the receiving unit (124) may receive the request based on the input operation of the user after the authentication of the authenticating unit (154).

Sixth feature: in the fifth feature, the key (152) may include an operating unit (156) and a transmitting unit (158) configured to transmit a desire based on an input operation on the operating unit (156) by the user to the receiving unit (124).

Seventh feature: in the fifth or sixth feature, the key (152) may include a tool (168a and 168b) performing the adjusting operation on the adjusting mechanism (100A to 100G).

According to the first feature, while a weight reduction is achieved by not including a driving source such as a servomotor or the like, it is possible for any user to change the set state of the part forming the vehicle body to an optimum set state corresponding to the request by performing the adjusting operation on the adjusting mechanism while checking the adjustment information indicated from the indicating unit (for example while viewing the screen of the display device (instrument panel or the like) mounted in the vehicle).

According to the second feature, a difference between the degree of adjusting operation performed in the past (at least a previous time) and the degree of adjusting operation corresponding to the request made this time is indicated to the user. Therefore, a specific degree of adjusting operation to be performed from a present state can be grasped easily, so that the adjusting operation can be facilitated. When adjustment information recommended by a manufacturer is registered as past adjustment information, an optimum set state can be restored at any time.

According to the third feature, history information related to past adjustment information is displayed. Thus, adjustment information satisfactory to the user among pieces of past adjustment information can be received as a next request.

According to the fourth feature, items such for example as riding by one person/riding by two persons, circuit racecourse/mountain pass/urban area, and road surface conditions such as in rainy weather or the like are set as the item. Then, these items are displayed, and items selected from these items are received as the request. Therefore the set state of the part forming the vehicle body can be changed to an optimum set state corresponding to the request.

According to the fifth feature, the authentication of the key carried by the user and the saddle riding type vehicle makes it possible to receive only a request from the user of the saddle riding type vehicle, and is therefore effective in preventing tampering or the like. Incidentally, the authentication may be an authentication by communication between the key and the saddle riding type vehicle, or may be a mechanical authentication by inserting the key into a key cylinder installed in the saddle riding type vehicle and rotating the key.

According to the sixth feature, when the user inputs a desire, the desire may be input by using an operating input unit including a screen mounted on the saddle riding type vehicle. A meter panel, a navigation screen, or the like mounted on the saddle riding type vehicle may be made to serve also as the operating input unit. However, a measure such as increasing the size of a screen display region for displaying the desire or increasing operating switches, for example, may be needed. However, the provision of the operating unit and the transmitting unit to the key carried by the user eliminates the need for increasing the size of the screen of the operating input unit of the saddle riding type vehicle or increasing switches.

According to the seventh feature, because generally the user always carries the key, adjusting operation on the adjusting mechanism can be surely performed.

BRIEF DESCRIPTION OF THE DRAWINGS

FIG. 4 is a block diagram showing a configuration of a setting assisting section (first setting assisting section) according to a first concrete example.

FIG. 5 is a diagram of assistance in explaining a mode of display of items displayed on a liquid crystal panel or the like.

FIG. 6 is a diagram of assistance in explaining a mode of display of various kinds of adjustment information displayed on the liquid crystal panel or the like by the first setting assisting section.

FIG. 7 is a flowchart showing processing operation of the first setting assisting section.

FIG. 18A is a plan view showing an example in which projecting portions formed so as to resemble the shapes of end portions of tools are provided to the side surfaces of the mechanical key, FIG. 18B is a plan view showing an example in which the projecting portions formed so as to resemble the shapes of the end portions of the tools are provided to the side surfaces of the electronic key, FIG. 18C is a diagram of assistance in explaining an example in which the projecting portions are exposed by operating buttons provided to the holding portion of the mechanical key, and FIG. 18D is a diagram of assistance in explaining an example in which the projecting portions are exposed by operating the buttons provided to the casing of the electronic key.

DETAILED DESCRIPTION OF DRAWINGS

An example of embodiment in which a saddle riding type vehicle according to the present application is applied to a motorcycle will hereinafter be described with reference to FIGS. 1 to 18D.

Figure 1:
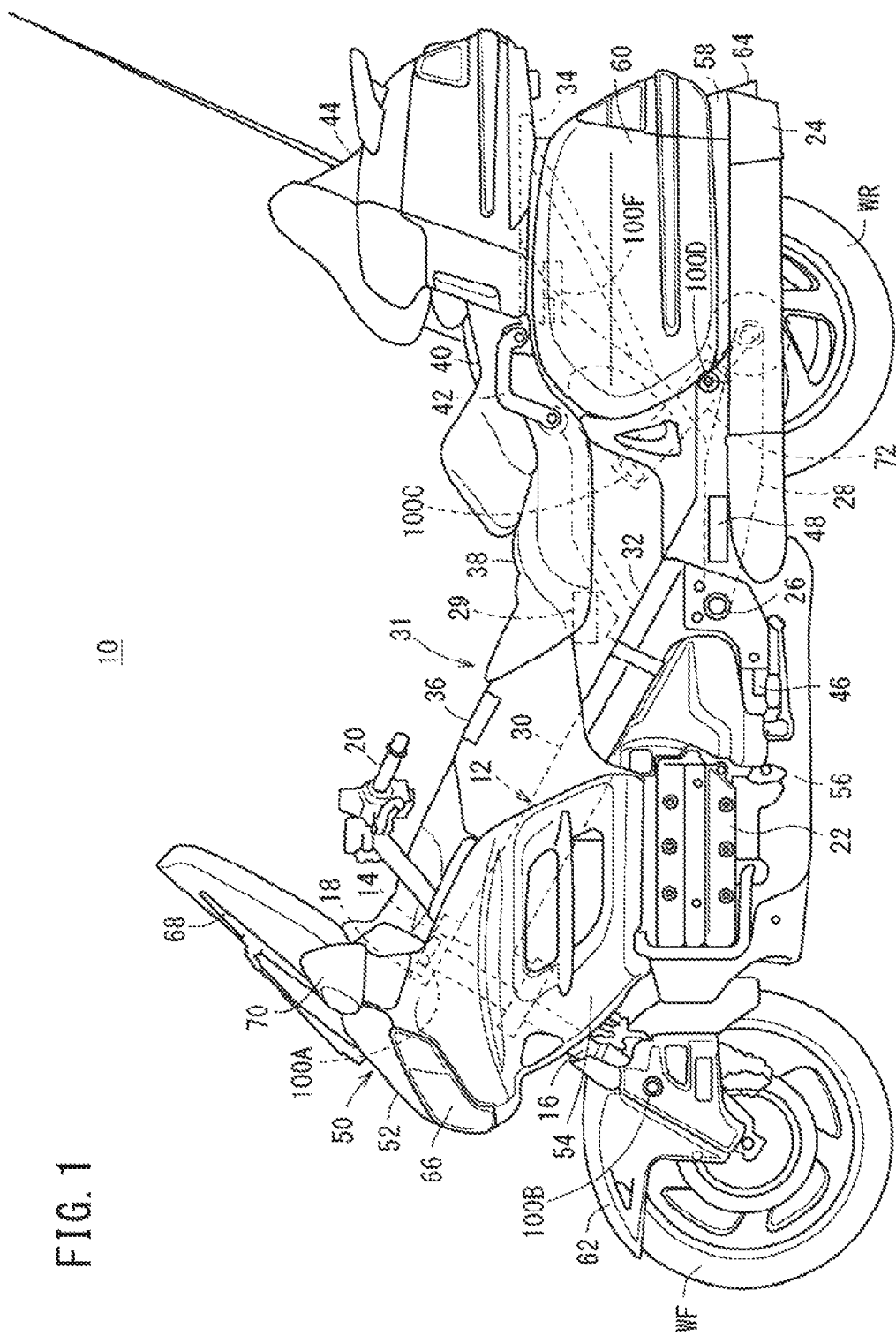
FIG. 1 is a side view showing an example of a motorcycle according to a present embodiment.
Figure 2:
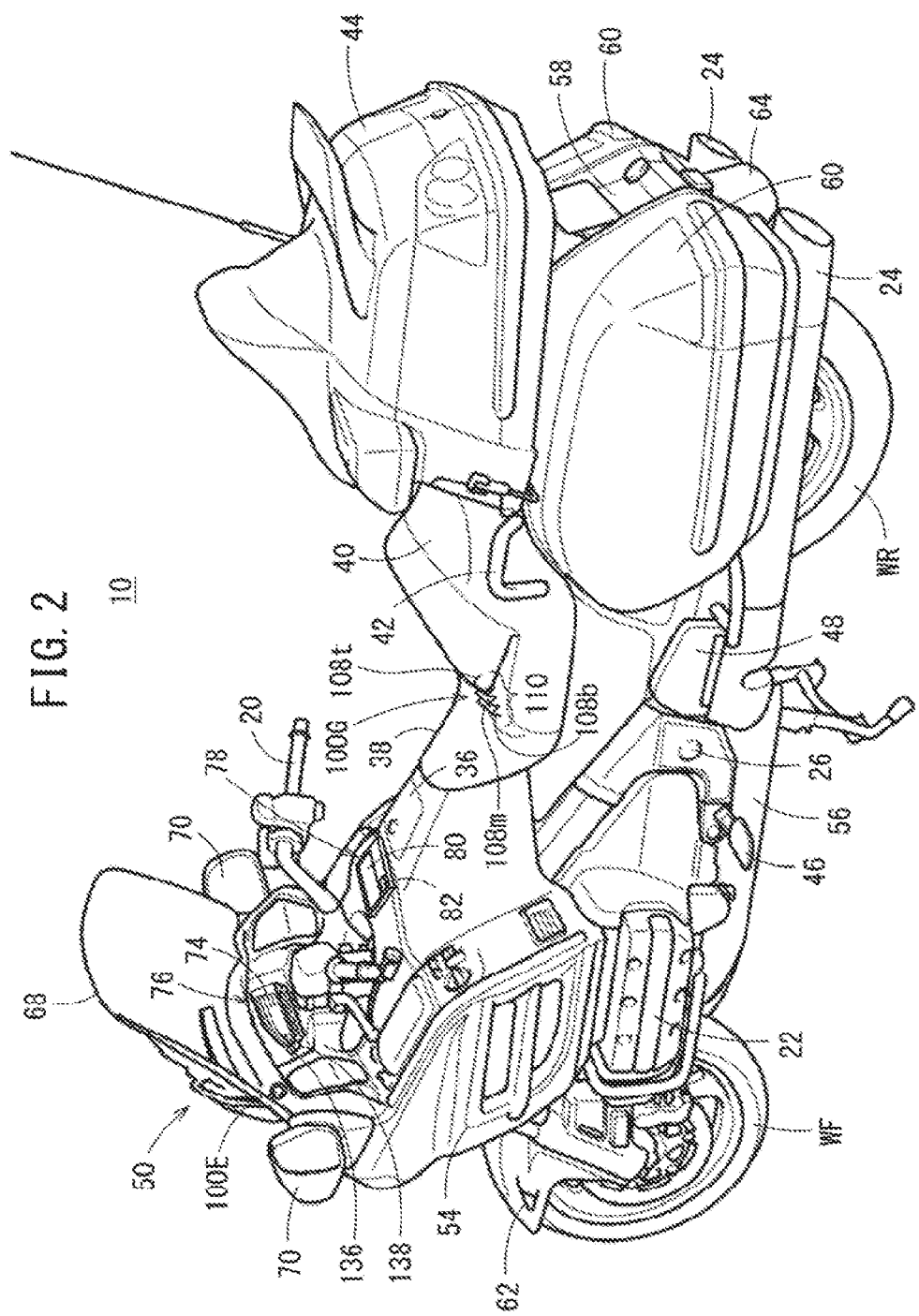
FIG. 2 is a rear perspective view of an external appearance of the motorcycle.

As shown in FIG. 1 and FIG. 2, a motorcycle 10 according to the present embodiment includes: a vehicle body frame 12; a head pipe 14 provided to the front end portion of the vehicle body frame 12; a pair of left and right front fork members 16 rotatably supported by the head pipe 14; handlebars 20 attached to a top bridge 18 supporting the upper end portion of the front fork members 16; a front wheel WF attached to the front fork members 16; an engine 22 supported by the vehicle body frame 12; an exhaust muffler 24 coupled to the engine 22 via an exhaust pipe not shown in the figures; a swing arm 28 swingably supported by a pivot shaft 26 in the rear lower portion of the vehicle body frame 12; a rear wheel WR attached to the rear end portion of the swing arm 28; and an ECU (control unit) 29 that controls the motorcycle 10. A setting assisting section 120 to be described later (see FIG. 4, FIG. 8, and FIG. 11) is incorporated in the ECU 29. Parts of the motorcycle 10 excluding the front wheel WF, the rear wheel WR, and the engine 22 constitute a vehicle body 31 of the motorcycle 10.

The vehicle body frame 12 includes: a pair of left and right main frames 30 branching left and right from the head pipe 14 and extending rearward and obliquely downward; a pair of left and right pivot plates 32 connected to the rear portions of the main frames 30; and a pair of left and right seat frames 34 extending rearward and obliquely upward from the front portions and rear portions of the pivot plates 32. A fuel tank 36 is provided over the main frames 30. A driver seat 38 and a passenger seat 40 are attached to the upper portions of the seat frames 34. A grab rail 42 and a trunk box 44 are attached to the rear of the passenger seat 40.

A pair of left and right steps 46 for a driver seated on the driver seat 38 and a pair of left and right steps 48 for a passenger seated on the passenger seat 40 are attached to the pivot plates 32 of the vehicle body frame 12.

A vehicle body cowling 50 is attached to the vehicle body frame 12. The vehicle body cowling 50 includes: a front cover 52 covering the front of the vehicle body 31; a pair of left and right side covers 54 covering the side portions of the vehicle body 31; an under cover 56 covering the lower portion of the vehicle body 31; and a rear seat cowl 58 covering the rear portion of the vehicle body 31. A pair of left and right saddlebags 60 is formed integrally with the rear seat cowl 58. In addition, a front fender 62 covering the front wheel WF is attached to the front fork members 16, and a rear fender 64 covering the rear wheel WR is attached to the rear seat cowl 58. A headlight 66 is attached to the front surface of the front cover 52. A windshield screen 68 is attached to the upper portion of the front surface of the front cover 52. Sideview mirrors 70 are attached to the left and right ends of the front surface of the front cover 52. In addition, a rear suspension 72 is installed so as to be stretched between the vehicle body frame 12 and the swing arm 28.

Further, a meter device 76 having a liquid crystal panel 74 that displays an engine tachometer (tachometer), a vehicle speed, various kinds of guidance, and the like is attached to the front cover 52 of the vehicle body 31 so as to be positioned between the windshield screen 68 and the handlebars 20. As required, a display panel 80 (liquid crystal display panel or the like) of a navigation device 78 that displays the present position of the motorcycle 10 and performs route guidance to a destination is placed in such a position as to be easily viewed by a user (driver or passenger), or between the handlebars 20 and the fuel tank 36, for example. In addition, the navigation device 78 has a connector for a USB memory, for example, the connector being placed in the vicinity of the display panel 80. A shutter 82 is openably/closably attached to the connector.

In addition, as shown in FIG. 1 and FIG. 2, the motorcycle 10 includes: a first adjusting mechanism 100A that adjusts the damping force (area of an oil passage of a hydraulic damper) of the front fork members 16 (front suspension); a second adjusting mechanism 100B that adjusts an amount of protrusion (preload) of the front fork members 16; a third adjusting mechanism 100C that adjusts the damping force of the rear suspension 72; a fourth adjusting mechanism 100D that adjusts an initial load (preload) applied to the spring of the rear suspension 72; a fifth adjusting mechanism 100E (see FIG. 2) that adjusts the vertical position of the windshield screen 68; a sixth adjusting mechanism 100F that adjusts the damping force of a rear cushion (not shown); and a seventh adjusting mechanism 100G (see FIG. 2) that adjusts the longitudinal and vertical position of the driver seat 38.

Figure 3A:
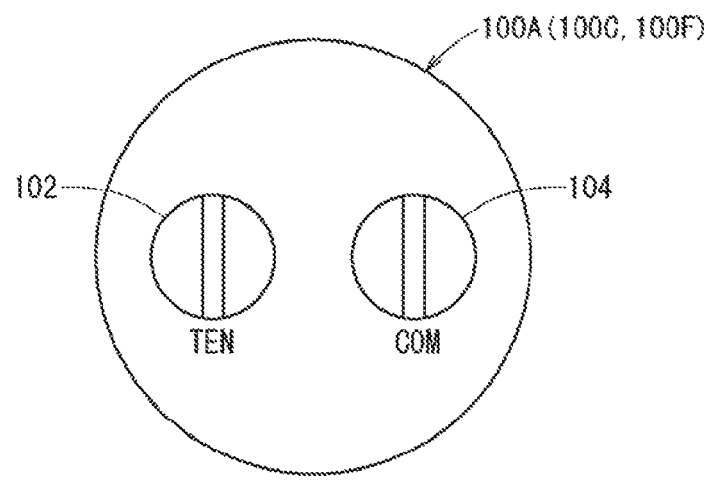
FIG. 3A is a plan view showing an example of an adjusting mechanism for adjusting the damping force of a front fork, a rear suspension, or a rear cushion.

Of these adjusting mechanisms, as representatively shown in FIG. 3A, the first adjusting mechanism 100A, the third adjusting mechanism 100C, and the sixth adjusting mechanism 100F include an extension side adjusting unit 102 and a compression side adjusting unit 104 that can be rotated by for example a slotted screwdriver as a tool. Scales not shown in the figure are displayed along circumferences around the peripheries of the extension side adjusting unit 102 and the compression side adjusting unit 104. The extension side adjusting unit 102 of the first adjusting mechanism 100A, for example, is rotated by a predetermined amount when the tool is rotated clockwise, for example, from a state of a minimum extension to a state of a maximum extension. That is, in this case, a maximum adjustment range is for example 10 graduations, and a state of an intermediate extension is 5 graduations. The same is true for the compression side adjusting unit 104. Incidentally, the maximum adjustment range of the extension side adjusting unit 102 and the compression side adjusting unit 104 in the third adjusting mechanism 100C is for example 10 graduations, and the maximum adjustment range of the extension side adjusting unit 102 and the compression side adjusting unit 104 in the sixth adjusting mechanism 100F is for example 5 graduations.

Figure 3B:
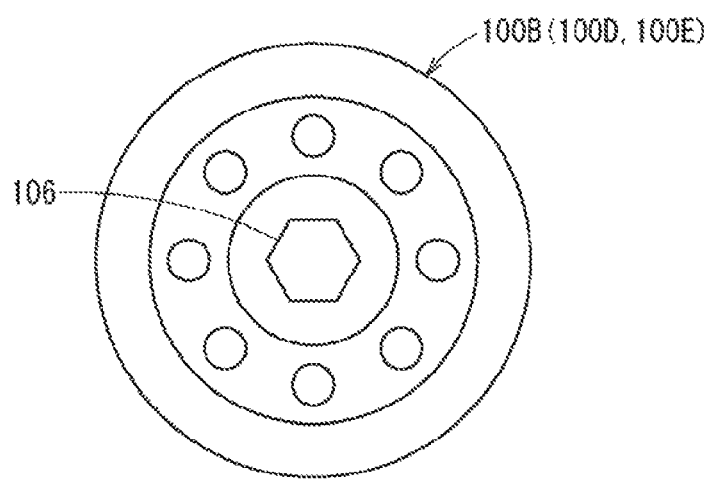
FIG. 3B is a plan view showing an example of an adjusting mechanism for adjusting the amount of protrusion of the front fork, the preload of the rear suspension, or the vertical position of a windshield screen.

As representatively shown in FIG. 3B, the second adjusting mechanism 100B, the fourth adjusting mechanism 100D, and the fifth adjusting mechanism 100E include an adjusting unit 106 that can be rotated by for example a hexagonal wrench as a tool. The second adjusting mechanism 100B, for example, is rotated by a predetermined amount when the tool is rotated clockwise, for example, from a state of a minimum amount of protrusion to a state of a maximum amount of protrusion. That is, in this case, a maximum adjustment range is 15 graduations, and a state of an intermediate amount of protrusion is 8 or 9 graduations. The maximum adjustment range of the fourth adjusting mechanism 100D is also 15 graduations, for example. Incidentally, the fifth adjusting mechanism 100E allows the vertical position of the windshield screen 68 to be adjusted by rotating the rotatable adjusting unit 106 with for example the hexagonal wrench as a tool. The maximum adjustment range in this case is for example 4 graduations.

As shown in FIG. 2, the seventh adjusting mechanism 100G has a base 110 including a plurality of steps (for example a lower step 108b, a middle step 108m, and an upper step 108t). When the driver seat 38 is installed on the lower step 108b of the base 110, the driver seat 38 is positioned at a lowermost and foremost position. When the driver seat 38 is installed on the upper step 108t of the base 110, the driver seat 38 is positioned at an uppermost and rearmost position. Similarly, when the driver seat 38 is installed on the middle step 108*m* of the base 110, the driver seat 38 is fixed to an intermediate position between the upper step 108*t* and the lower step 108*b*.

In driving the motorcycle 10, for example depending on the weight of the driver, whether one person is riding or two persons are riding, whether the motorcycle 10 is traveling in a circuit racecourse, a mountain pass, an urban area, or the like, or whether a road surface is dry (DRY) or wet (WET), for example, the damping forces of the front fork members 16 and the rear suspension 72 and the like can be adjusted, that is, set according to the preferences of the driver. The weight of the passenger and the like may be further included.

However, as described above, the setting needs to be adjusted according to various traveling conditions and the like. Thus, trial and error is repeated while various kinds of adjusting mechanisms are adjusted, and thus it generally takes a long time before desired settings are grasped.

Accordingly, the present embodiment has a setting assisting section 120 that receives information indicating under which traveling conditions the motorcycle 10 is to travel as a request of the user, and which indicates, to the user as adjustment information, degrees of adjusting operations on various kinds of adjusting mechanisms in accordance with the received request.

Figure 8:
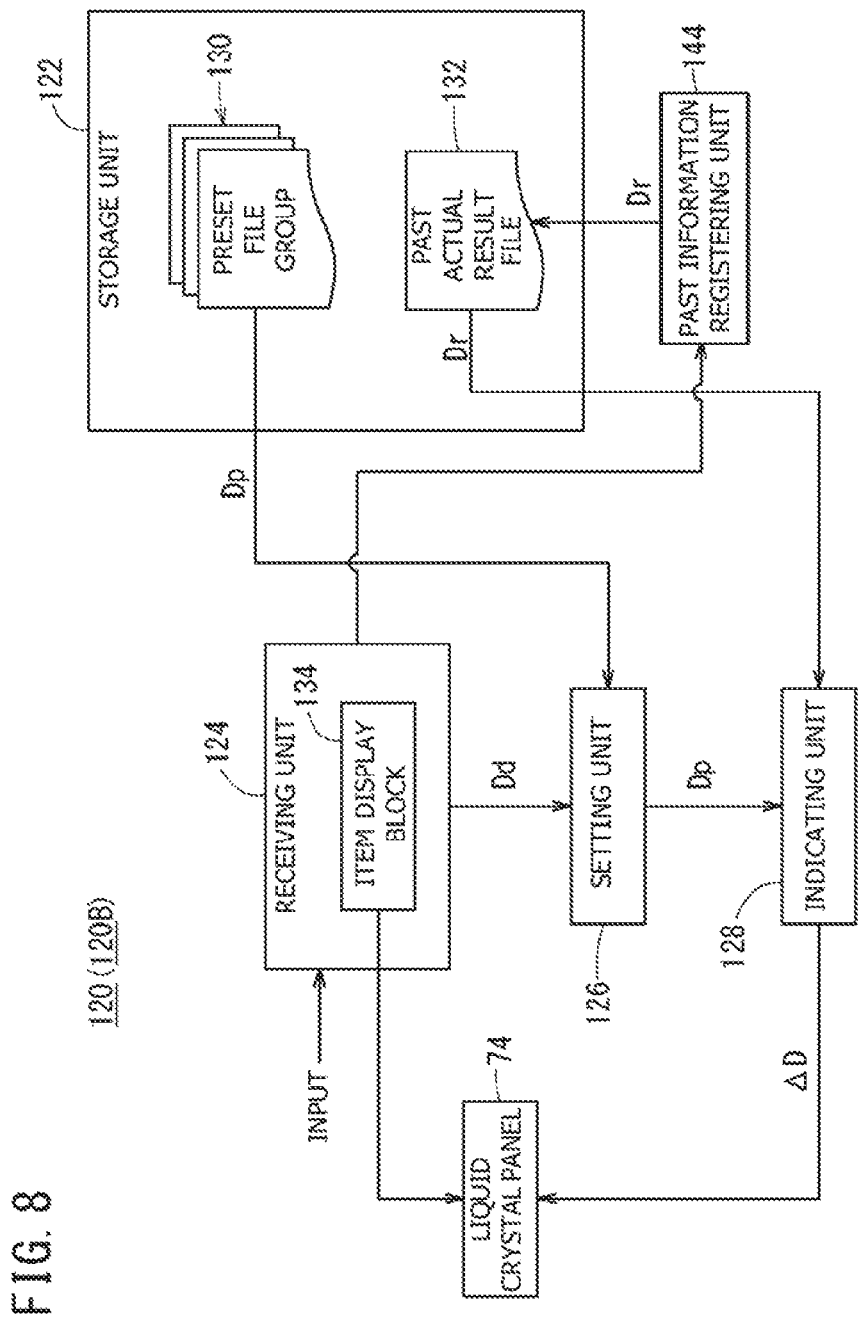
FIG. 8 is a block diagram showing a configuration of a setting assisting section (second setting assisting section) according to a second concrete example.
Figure 11:
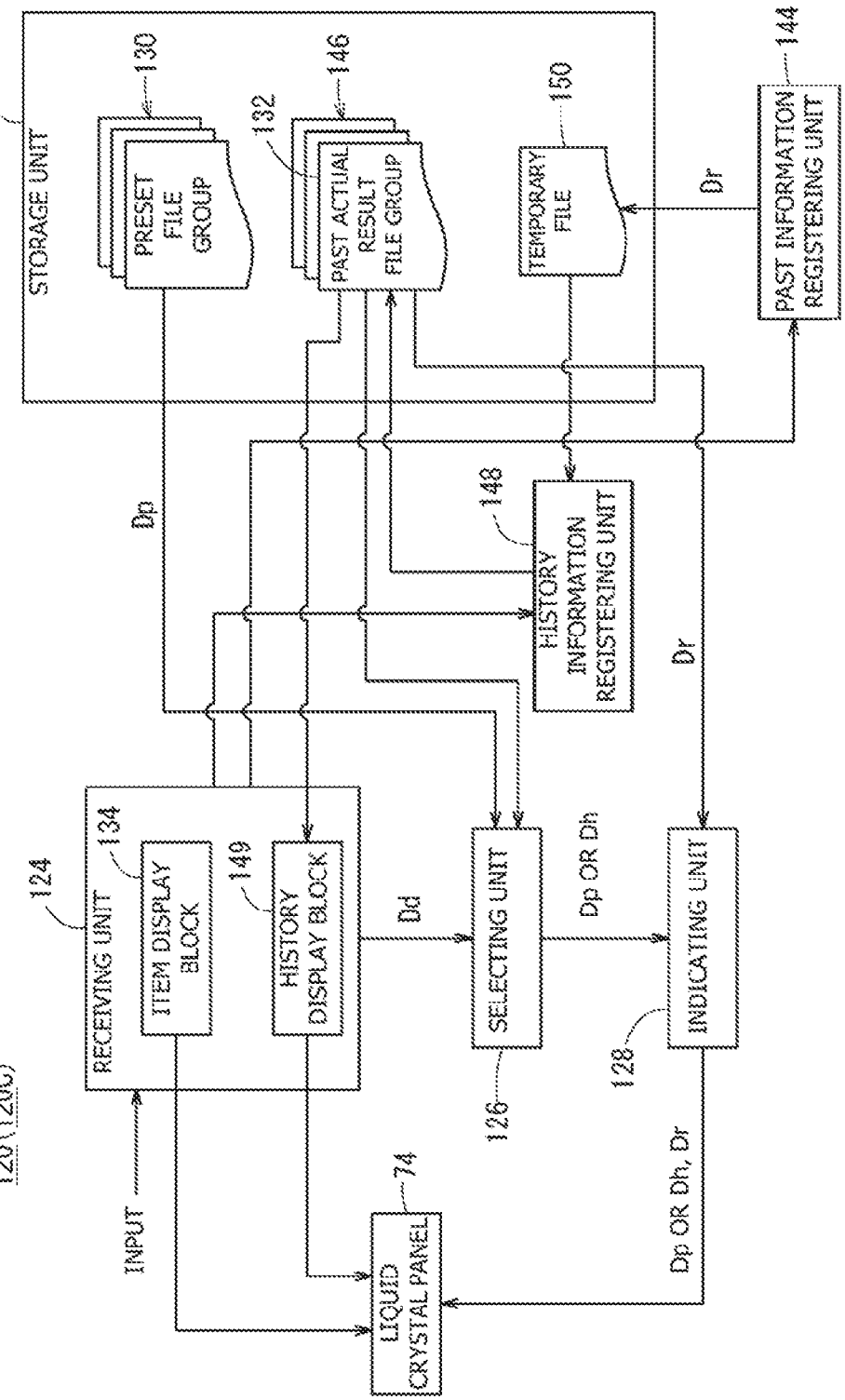
FIG. 11 is a block diagram showing a configuration of a setting assisting section (third setting assisting section) according to a third concrete example.

As shown in FIG. 4, FIG. 8, and FIG. 11, the setting assisting section 120 includes: a storage unit 122 that stores at least a plurality of pieces of adjustment information related to degrees of adjusting operation on the respective adjusting mechanisms; a receiving unit 124 that receives a request based on input operation of the user; a selecting unit 126 that selects adjustment information corresponding to the request received by the receiving unit 124 from the plurality of pieces of adjustment information in the storage unit 122; and an indicating unit 128 that indicates the adjustment information selected by the selecting unit 126 to the user.

The setting assisting section 120 is started by an operation of selecting an icon representing setting assistance, for example, which icon is displayed on the liquid crystal panel 74 of the meter device 76, for example.

A few concrete examples of the setting assisting section 120 will be described in the following with reference to FIGS. 4 to 18D.

First, as shown in FIG. 4, the storage unit 122 of a setting assisting section according to a first concrete example (hereinafter written as a first setting assisting section 120A) stores, in advance, for example a preset file group 130 in which adjustment information (preset information Dp) recommended by a manufacturer is registered and a past actual result file 132 in which a present setting state (adjustment information registered by setting in the past) is registered. The "past" includes at least a previous time.

The receiving unit 124 includes an item display block 134 that displays items related to traveling conditions on the liquid crystal panel 74, for example.

As a form of display of the items by the item display block 134, for example four items (a first item to a fourth item) are displayed, as shown in FIG. 5.

In the first item, for example items related to the weight of the driver, that is, for example "41 kg to 60 kg," "61 kg to 80 kg," and "81 kg to 100 kg" or the like, are displayed. In the second item, items related to the number of occupants, for example items "riding by one person" and "riding by two persons" or the like, are displayed. In the third item, items related to a traveling area, for example items "circuit racecourse," "mountain pass," and "urban area" or the like, are displayed. In the fourth item, items related to a road surface, for example "DRY" indicating a dry road surface and "WET" indicating a wet road surface, are displayed. Another item related to the weight of the passenger, for example, may be added.

The user selects appropriate items, or four kinds of items in the above-described example, by for example performing input operation of a button 136 and a switch 138 (see FIG. 2) installed on the meter device 76 or the like. In the example of FIG. 5, "61 kg to 80 kg," "riding by one person," "mountain pass," and "DRY" are selected. The receiving unit 124 receives the four selected kinds of items as request data Dd from the user, and outputs the request data Dd to the selecting unit 126.

The selecting unit 126 selects preset information Dp (recommended adjustment information) corresponding to the combination of the items of the received request data Dd from the preset file group 130 stored in the storage unit 122, and outputs the preset information Dp to the indicating unit 128.

The indicating unit 128 displays at least the preset information Dp selected by the selecting unit 126 on the liquid crystal panel 74. As a form of display of adjustment information, as shown in FIG. 6, for example, five display regions (a first display region 142A to a fifth display region 142E) separated for respective parts display degrees of adjusting operation on the adjusting mechanisms for the respective corresponding parts.

For example, the first display region 142A displays, in relation to the front fork members 16, each of present setting states (states resulting from a previous adjustment) of the extension side adjusting unit 102 and the compression side adjusting unit 104 in the first adjusting mechanism 100A and the adjusting unit 106 in the second adjusting mechanism 100B and recommended settings corresponding to the request made this time (degrees of rotation in a clockwise direction, for example, from a reference position, the degrees being recommended by the manufacturer). The example of FIG. 6 displays, as an example, 4/10 as the present state of the extension side adjusting unit 102 (TEN) and 5/10 as the recommended degree of adjustment of the extension side adjusting unit 102 (TEN). Similarly, 3/10 and 3/10 are displayed as the present state and the recommended degree of adjustment of the compression side adjusting unit 104 (COM), and 6/15 and 5/15 are displayed as the present state and the recommended degree of adjustment of the adjusting unit 106 (SPRG). The denominator of 5/10 or the like represents graduations of a maximum adjustment range, and the numerator represents graduations to which adjustment has been made or graduations to which adjustment is to be made.

Hence, the present example indicates that the extension side adjusting unit 102 (TEN) is to be rotated clockwise by one graduation, and that the adjusting unit 106 (SPRG) is to be rotated counterclockwise by one graduation. The present state and the recommended degree of adjustment of the compression side adjusting unit 104 (COM) are the same, which indicates that no adjustment is required. Of course, adjustment may be made according to the preferences of the user. The receiving unit 124 displays fields for inputting settings made this time (numbers indicating graduations and a step number to which setting is actually made) on the right end sides of the first to fifth display regions 142A to 142E. In the example of FIG. 6, a setting different from the recommended degree of adjustment is made only for the adjusting unit (SPRG), and the adjusting unit (SPRG) is adjusted to graduation 4.

The second display region 142B displays, in relation to the rear suspension 72, as in the above-described case of the front fork members 16, the present states of the extension side adjusting unit 102 and the compression side adjusting unit 104 in the third adjusting mechanism 100C and the adjusting unit 106 in the fourth adjusting mechanism 100D and degrees of adjustment corresponding to the request made this time. The example of FIG. 6 displays, as an example, 4/10 and 3/10 for the extension side adjusting unit 102 (TEN), 5/10 and 5/10 for the compression side adjusting unit 104 (COM), and 4/15 and 5/15 for the adjusting unit 106 (SPRG).

The above-described example supposes a case where the front fork members 16 and the rear suspension 72 both have the same maximum adjustment ranges on the left and right sides. However, in a case where the left and right maximum adjustment ranges are different from each other, divided pieces of adjustment information for the left and the right, respectively, are displayed.

The third display region 142C displays, on the other hand, in relation to the windshield screen 68, the present state of the adjusting unit 106 in the fifth adjusting mechanism 100E and a degree of adjustment corresponding to the request made this time. The example of FIG. 6 displays, as an example, 2/4 and 1/4 for the adjusting unit 106.

The fourth display region 142D displays, in relation to the rear cushion, as in the above-described case of the front fork members 16, the present states of the extension side adjusting unit 102 and the compression side adjusting unit 104 in the sixth adjusting mechanism 100F and degrees of adjustment corresponding to the request made this time. The example of FIG. 6 displays, as an example, 3/10 and 3/10 for the extension side adjusting unit 102 (TEN) and 4/10 and 5/10 for the compression side adjusting unit 104.

The fifth display region 142E displays the present state of the driver seat 38 (step on which the driver seat 38 is installed) and a degree of adjustment corresponding to the request made this time (step on which to install the driver seat 38). For example, "1" is displayed in the case of the lower step, "2" is displayed in the case of the middle step, and "3" is displayed in the case of the upper step. FIG. 6 represents an example in which "1" and "2" are displayed. The receiving unit 124 displays a field for inputting a number indicating an actually set step number on the right end side of the fifth display region 142E. The example of FIG. 6 represents a case where a number "2" is input, the number "2" indicating that adjustment has been made to the middle step, which is the same as the recommended degree of adjustment.

Incidentally, in a case where the liquid crystal panel 74 has a small display screen, scrolling display of the first to fifth display regions 142A to 142E may be made, or switching display of the first to fifth display regions 142A to 142E may be made in order each time the button 136 is pressed.

The first setting assisting section 120A further includes a past information registering unit 144. The past information registering unit 144 creates adjustment information corresponding to the settings made this time on the basis of the numbers (actual results) input on the respective right end sides of the first to fifth display regions 142A to 142E as the settings made this time, and registers the adjustment information as past information Dr in the past actual result file 132 (overwrites the past actual result file 132 in this case). Incidentally, at a time of shipment of the motorcycle 10, adjustment information corresponding to the set states of the respective adjusting mechanisms at the time of the shipment is registered in the past actual result file 132.

The processing operation of the first setting assisting section 120A will be described in the following with reference to a flowchart of FIG. 7.

First, the first setting assisting section 120A is started by performing an operation of selecting the icon representing setting, the icon being displayed on the liquid crystal panel 74, for example. In first step S1, the item display block 134 of the receiving unit 124 displays items related to traveling conditions (see FIG. 5) on the liquid crystal panel 74.

In step S2, the user selects appropriate items, or four kinds of items in the above-described example, by for example performing input operation of the button 136 and the switch 138 installed on the meter device 76 or the like.

In step S3, the receiving unit 124 receives the four selected kinds of items as request data Dd from the user, and outputs the received request data Dd to the selecting unit 126.

In step S4, the selecting unit 126 selects adjustment information corresponding to the combination of the items of the received request data Dd from the preset file group 130 stored in the storage unit 122.

In step S5, the indicating unit 128 displays, on the liquid crystal panel 74, previous adjustment information (past information Dr) registered in the past actual result file 132 and the recommended adjustment information (preset information Dp) selected by the selecting unit 126 this time.

In step S6, the user performs adjusting operation on adjusting mechanisms to be adjusted by using tools while referring to the adjustment information displayed on the liquid crystal panel 74.

In step S7, the user inputs numbers indicating graduations and a step number to which setting is actually made in relation to the adjusting mechanisms on which the adjusting operation is ended, by operating the button 136 and the switch 138 or the like. That is, actual setting information is input.

In step S8, the first setting assisting section 120A determines whether or not all of the adjusting operation is ended. This determination is made according to whether the user has performed an operation of selecting an end button displayed on the liquid crystal panel 74, for example.

The processing of steps S6 to S8 is repeated until all of the adjusting operation is ended.

Then, when all of the adjusting operation is ended, the processing proceeds to step S9, where the past information registering unit 144 creates adjustment information corresponding to the settings made this time on the basis of the numbers (actual results) input on the respective right end sides of the first to fifth display regions 142A to 142E as the settings made this time, and registers the adjustment information as past information Dr in the past actual result file 132.

The processing in the first setting assisting section 120A is ended when the processing in step S9 is ended.

The motorcycle 10 having the first setting assisting section 120A thus allows the user to perform adjusting operation on adjusting mechanisms while checking the adjustment information indicated from the indicating unit 128 (while viewing the screen of the liquid crystal panel 74 mounted in the motorcycle 10, for example). That is, it is possible to allow any user to change the set states of parts forming the vehicle body 31 to optimum set states corresponding to a request while achieving a weight reduction by not including a driving source such as a servomotor or the like.

In addition, in making setting, it is possible to refer to the previous setting information and the recommended degrees of adjustment corresponding to the request made this time. A person with no experience in the setting can therefore make the setting easily. Thus, widespread use of the motorcycle 10 can be expected.

A setting assisting section according to a second concrete example (hereinafter written as a second setting assisting section 120B) will next be described with reference to FIGS. 8 to 10.

As shown in FIG. 8, the second setting assisting section 120B has a substantially similar configuration to that of the above-described first setting assisting section 120A, but is different from the first setting assisting section 120A in the following respect.

The indicating unit 128 indicates, to the user, differences ΔD between degrees of adjusting operation indicated by past information Dr registered in the past actual result file 132 of the storage unit 122 by the past information registering unit 144 and degrees of adjusting operation indicated by preset information Dp selected by the selecting unit 126 this time.

Figure 9:
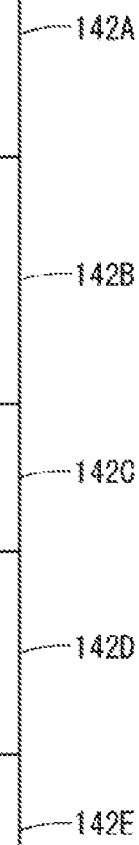
FIG. 9 is a diagram of assistance in explaining a mode of display of various kinds of adjustment information displayed on the liquid crystal panel or the like by the second setting assisting section.
Figure 10:
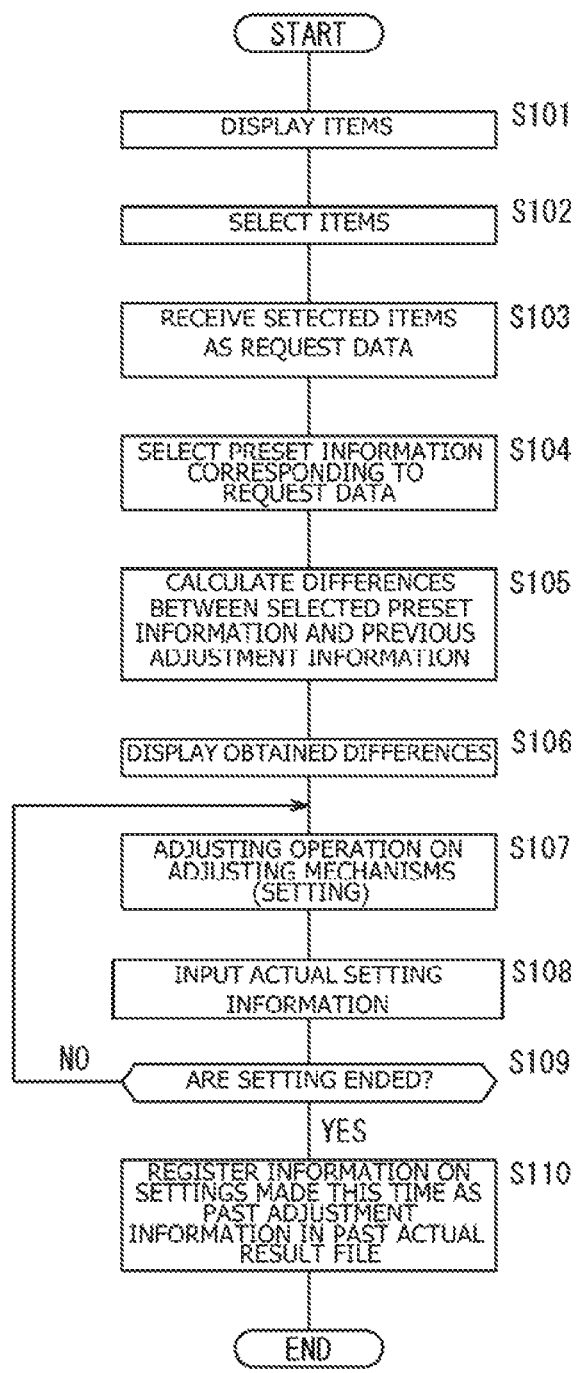
FIG. 10 is a flowchart showing processing operation of the second setting assisting section.

For example, describing mainly adjusting operation on the first adjusting mechanism 100A and the second adjusting mechanism 100B, suppose that as shown in FIG. 9, the past information Dr for example indicates 4/10 for the extension side adjusting unit 102 (TEN), 3/10 for the compression side adjusting unit 104 (COM), and 6/15 for the adjusting unit 106 (SPRG). Then, in a case where the preset information Dp selected by the selecting unit 126 this time indicates 5/10 for the extension side adjusting unit 102 (TEN), 3/10 for the compression side adjusting unit 104 (COM), and 5/15 for the adjusting unit 106 (SPRG), the indicating unit 128 indicates, as the differences ΔD between these values, "+1" for the extension side adjusting unit 102 (TEN), "0" for the compression side adjusting unit 104 (COM), and "−1" for the adjusting unit 106 (SPRG).

It suffices for the user only to rotate the compression side adjusting unit 104 (COM) of the first adjusting mechanism 100A in a clockwise direction by one graduation from the present position. When −1, for example, is indicated from the indicating unit 128, it suffices to rotate the compression side adjusting unit 104 (COM) in a counterclockwise direction by one graduation from the present position. Of course, even when +1 is displayed, rotating operation may be performed in the clockwise direction or the counterclockwise direction by for example two graduations, three graduations, or the like, according to a preference. Similarly, even in a case of an adjusting mechanism for which "0" is displayed, rotation may be performed in the clockwise direction or the counterclockwise direction by for example one graduation, two graduations, or the like from the present position depending on the preference of the user.

Similarly, as for adjusting operation on the seventh adjusting mechanism 100G, when the adjustment information registered in the past actual result file 132 indicates "1," which represents the lower step, and the adjustment information selected by the selecting unit 126 this time indicates "2," which represents the middle step, for example, the indicating unit 128 indicates "+1," which is a difference between these values.

According to this indication, the user raises the driver seat 38 by one step. That is, it suffices to position the driver seat 38 on the middle step 108m. Of course, even when "+1" is displayed, the driver seat 38 may be retained in the present position or may be positioned on the upper step 108t according to a preference.

As in the above-described first setting assisting section 120A, fields for input signed numbers corresponding to settings actually made are displayed on the respective right end sides of the first to fifth display regions 142A to 142E. The first to fourth display regions 142A to 142D, in particular, display the above-described differences ΔD together with signs indicating directions. Thus, graduations by which rotating operation has been actually performed in the clockwise direction or the counterclockwise direction are input together with the signs indicating the directions on the respective right end sides of the first to fourth display regions 142A to 142D. For example, +2 is input when rotating operation has been performed by two graduations in the clockwise direction, and −2 is input when rotating operation has been performed in the counterclockwise direction.

For the first to sixth adjusting mechanisms 100A to 100F, the past information registering unit 144 creates adjustment information corresponding to the settings made this time on the basis of the signed numbers (actual results) input on the respective right end sides of the first to fourth display regions 142A to 142D as the settings made this time and the past information Dr registered in the past actual result file 132, and registers the adjustment information in the past actual result file 132 (overwrites the past actual result file 132). For the seventh adjusting mechanism 100G, the past information registering unit 144 creates adjustment information corresponding to the setting made this time on the basis of the signed number (actual result) input on the right end side of the fifth display region 142E as the setting made this time, and registers the adjustment information in the past actual result file 132.

The processing operation of the second setting assisting section 120B will be described in the following with reference to a flowchart of FIG. 10.

First, processing of steps S101 to S104 is substantially similar to the processing of steps S1 to S4 in the above-described first setting assisting section 120A, and therefore repeated description thereof will be omitted.

Then, in step S105, the indicating unit 128 calculates differences ΔD between the degrees of adjusting operation indicated by the past information Dr registered in the past actual result file 132 of the storage unit 122 and the degrees of adjusting operation indicated by the preset information Dp (see step S104) selected by the selecting unit 126 this time.

In step S106, the indicating unit 128 displays the calculated differences ΔD in the first to fifth display regions 142A to 142E of the liquid crystal panel 74.

In step S107, the user performs adjusting operation on adjusting mechanisms to be adjusted by using tools while referring to the adjustment information (differences ΔD) displayed on the liquid crystal panel 74.

In step S108, the user inputs signed numbers corresponding to settings actually made, in relation to the adjusting mechanisms on which the adjusting operation is ended, by operating the button 136 and the switch 138 or the like.

In step S109, the second setting assisting section 120B determines whether or not all of the adjusting operation is ended. This determination is made according to whether the user has performed an operation of selecting the end button displayed on the liquid crystal panel 74, for example.

The processing of steps S107 to S109 is repeated until all of the adjusting operation is ended.

Then, when all of the adjusting operation is ended, the processing proceeds to step S110, where the past information registering unit 144 creates adjustment information corresponding to the settings made this time on the basis of the signed numbers (actual results) input on the respective right end sides of the first to fifth display regions 142A to 142E as the settings made this time, and registers the adjustment information in the past actual result file 132.

The processing in the second setting assisting section 120B is ended when the processing in step S110 is ended.

The second setting assisting section 120B thus indicates, to the user, differences ΔD between degrees of adjusting operation performed in the past (at least the previous time) and degrees of adjusting operation corresponding to a request made this time. Therefore, specific degrees of adjusting operation to be performed from present states can be grasped easily, so that the adjusting operation can be facilitated. The adjustment information recommended by the manufacturer is used when the differences ΔD are calculated. Thus, even when the user performs adjusting operation different from the indicated adjustment information, optimum setting states can be restored at any time.

A setting assisting section according to a third concrete example (hereinafter written as a third setting assisting section 120C) will next be described with reference to FIGS. 11 to 15.

As shown in FIG. 11, the third setting assisting section 120C has a configuration substantially similar to that of the above-described first setting assisting section 120A, but is different from the first setting assisting section 120A in the following respect.

That is, the third setting assisting section 120C has a history information registering unit 148 that associates a plurality of past actual result files 132 with at least date and time information, and which registers the plurality of past actual result files 132 in the past actual result file group 146 of the storage unit 122. In addition, the receiving unit 124 includes a history display block 149 in addition to the item display block 134.

Figure 12:
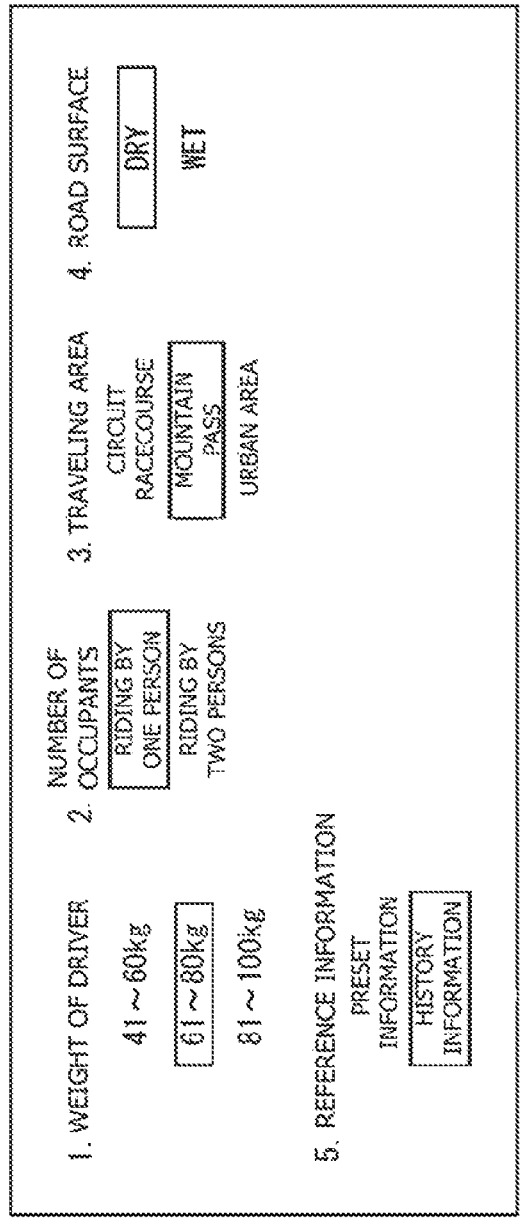
FIG. 12 is a diagram of assistance in explaining a mode of display of items displayed on the liquid crystal panel or the like by the third setting assisting section.

As shown in FIG. 12, the item display block 134 displays not only items related to the weight of a driver, items related to the number of occupants, items related to an area in which to travel, and items related to a road surface, but also items for selecting preset information Dp (information recommended by the manufacturer) or history information Dh (items related to reference information).

When the user selects four items, and further selects history information, the history display block 149 retrieves one or more past actual result files 132 corresponding to the selected four items from the past actual result file group 146, and displays outline information of the retrieved one or more past actual result files 132 in a list format, for example. The outline information includes for example a file number, a date and time, or the like registered in the past actual result file 132.

As an example of associating the past actual result file 132 with the date and time information, the past information registering unit 144 registers the past actual result file 132 in the storage unit 122 together with clock data from a timer of the ECU 29, for example. When the information is registered in the past actual result file 132, the information is registered in a temporary file 150 (work file) rather than the past actual result file 132 registered in the past actual result file group 146. The history information registering unit 148 thereafter registers the temporary file 150 as a latest past actual result file 132 in the past actual result file group 146.

In addition, evaluation information as well as the date and time information may be registered in the past actual result file 132. The evaluation information may include optimum "S," good "A," average "B," and poor "C," or the like. When the traveling performance of the motorcycle 10 in a mountain pass after certain settings are made is good, for example, the past actual result file 132 in which information on the settings is registered may be retrieved on the basis of the date and time information, and output to the liquid crystal panel 74 so that "A" indicating good is registered, for example. Of course, the coordinate data of the mountain pass may be received from a GPS or the like, and registered in the past actual result file 132. This is desirable because a past actual result file 132 indicating optimum or good can be created for each mountain pass, for example, and read out at any time. The same is true for circuit racecourses, urban areas, the state of a road surface, and the like.

Further, information on four kinds of corresponding items may be registered in the past actual result file 132. When the user selects four kinds of items, the four kinds of items can be used as search keys when the past actual result file 132 corresponding to the four selected kinds of items is retrieved from the past actual result file group 146.

Figure 13:
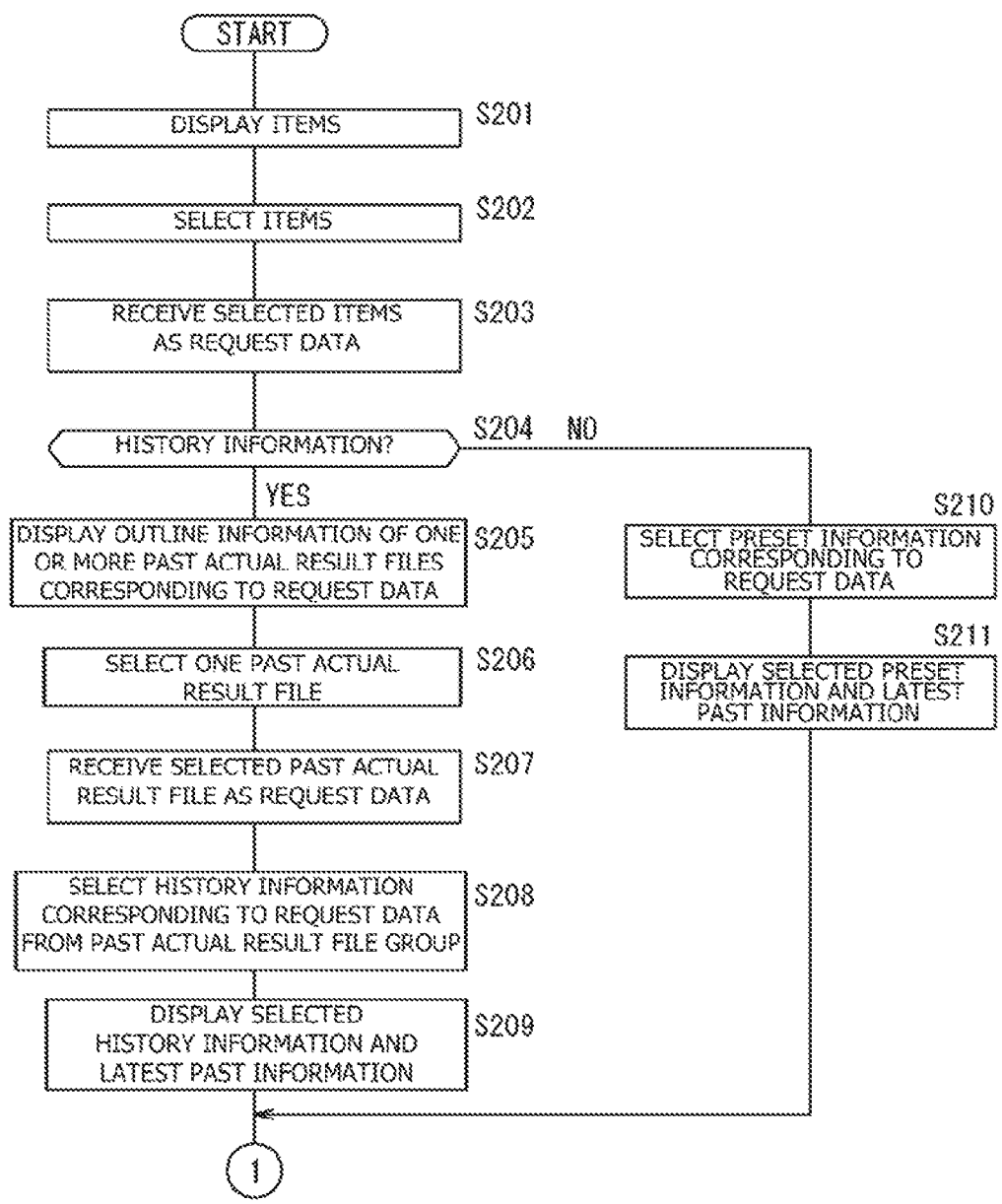
FIG. 13 is a flowchart (1) showing processing operation of the third setting assisting section.

The processing operation of the third setting assisting section 120C will be described in the following with reference to flowcharts of FIGS. 13 to 15.

First, the user performs an operation of selecting the icon indicating setting, the icon being displayed on the liquid crystal panel 74, for example, whereby the third setting assisting section 120C is started. In step S201 of FIG. 13, the item display block 134 of the receiving unit 124 displays items related to traveling conditions (see FIG. 12) on the liquid crystal panel 74.

In step S202, the user for example performs input operation of the button 136 and the switch 138 or the like to select four kinds of items, and further select either preset information Dp or history information Dh.

Then, in step S203, the receiving unit 124 receives, as request data Dd from the user, the four kinds of items selected by the user and flag information (for example 1/0=preset information/history information) indicating either the preset information Dp or the history information Dh that is selected by the user.

In step S204, the receiving unit 124 determines whether or not the user is requesting the history information on the basis of the flag information. When the user is requesting the history information, the processing proceeds to step S205, where the history display block 149 displays, in a list format, for example, outline information of one or more past actual result files 132 corresponding to the four selected items in the past actual result file group 146.

In step S206, the user refers to dates and times, evaluations, or the like displayed in the list format, and selects one past actual result file 132 by input operation.

In step S207, the receiving unit 124 receives the file number or the like of the selected one past actual result file 132 as request data Dd.

In step S208, the selecting unit 126 selects the adjustment information (history information Dh) corresponding to the request data Dd from the past actual result file group 146.

In step S209, the indicating unit 128 displays the history information Dh selected by the selecting unit 126 and past information Dr registered in the latest past actual result file 132 in the past actual result file group 146 on the liquid crystal panel 74.

When the user is not requesting the history information Dh but is requesting the preset information Dp in the above step S204, on the other hand, the processing proceeds to step S210, where as in the processing in the first setting assisting section 120A, the selecting unit 126 selects the preset information Dp corresponding to the combination of the items of the received request data Dd from the preset file group 130 stored in the storage unit 122.

In step S211, the indicating unit 128 displays the preset information Dp selected by the selecting unit 126 and the past information Dr registered in the latest past actual result file 132 in the past actual result file group 146 on the liquid crystal panel 74.

Figure 14:
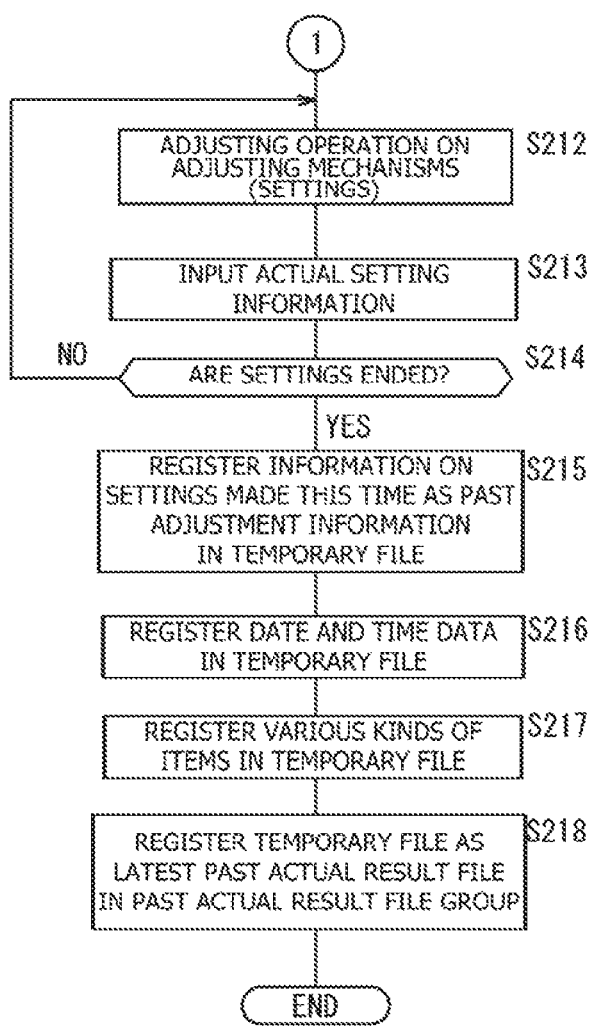
FIG. 14 is a flowchart (2) showing the processing operation of the third setting assisting section.

After the processing in step S209 or the processing in step S211 described above is ended, the processing proceeds to step S212 in FIG. 14. The user performs adjusting operation on adjusting mechanisms to be adjusted by using tools while referring to the adjustment information displayed on the liquid crystal panel 74.

In step S213, in relation to the adjusting mechanisms on which the adjusting operation is ended, the user inputs numbers indicating graduations and a step number to which setting is actually made, by operating the button 136 and the switch 138 or the like.

In step S214, the third setting assisting section 120C determines whether or not all of the adjusting operation is ended. This determination is made according to whether the user has performed an operation of selecting the end button displayed on the liquid crystal panel 74, for example.

The processing of steps S212 to S214 is repeated until all of the adjusting operation is ended.

Then, when all of the adjusting operation is ended, the processing proceeds to step S215, where the past information registering unit 144 creates adjustment information corresponding to the settings made this time on the basis of the numbers (actual results) input on the respective right end sides of the first to fifth display regions 142A to 142E as the settings made this time, and registers the adjustment information in the temporary file 150.

In step S216, the past information registering unit 144 registers date and time data according to the clock data from the timer of the ECU 29 in the temporary file 150.

In step S217, the past information registering unit 144 registers the four kinds of items received by the receiving unit 124 in the temporary file 150.

In step S218, the history information registering unit 148 registers the temporary file 150 as a latest past actual result file 132 in the past actual result file group 146.

When the processing in step S218 is ended, the processing in the third setting assisting section 120C is ended (suspended).

When the user thereafter performs an operation of selecting an icon representing evaluation, the icon being displayed on the liquid crystal panel 74, for example, the third setting assisting section 120C is restarted.

Figure 15:
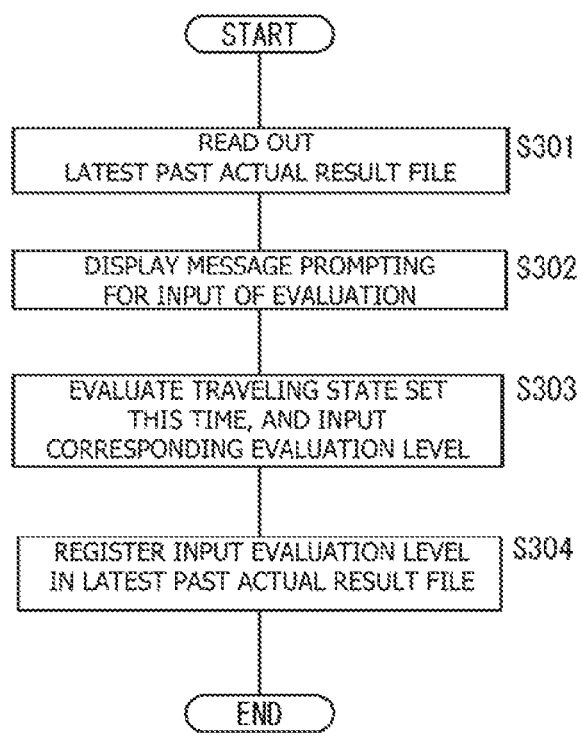
FIG. 15 is a flowchart showing processing of inputting an evaluation of a traveling state after setting in the third setting assisting section.

First, in step S301 in FIG. 15, the receiving unit 124 reads the latest past actual result file 132 from the past actual result file group 146.

In step S302, the receiving unit 124 displays at least a message prompting for input of an evaluation on the liquid crystal panel 74. In this case, the symbols "S," "A," "B," and "C" indicating evaluation levels are displayed in addition to for example the date and time and the four kinds of items registered in the latest past actual result file 132.

In step S303, the user evaluates a traveling state set this time, and moves a cursor to the symbol of a corresponding evaluation level and performs input, by using the button 136 and the switch 138 or the like.

In step S304, the history information registering unit 148 registers the input evaluation level in the latest past actual result file 132. In this stage, the processing in the third setting assisting section 120C is ended.

Thus, the third setting assisting section 120C produces effects similar to those of the first setting assisting section 120A, and displays information on dates and times and evaluations together with the adjustment information of past actual result files 132 registered as history information Dh. Therefore, adjustment information satisfactory to the user which adjustment information is included in the past adjustment information can be received as a next request.

In the above-described example, in step S209, the adjustment information according to the previous settings and the adjustment information registered in the past actual result file 132 received as the request data Dd this time are displayed on the liquid crystal panel 74, or in step S211, the adjustment information according to the previous settings and the adjustment information selected by the selecting unit 126 this time are displayed on the liquid crystal panel 74. In addition, in step S209, differences between the degrees of adjusting operation indicated by the adjustment information according to the previous settings and the degrees of adjusting operation indicated by the adjustment information registered in the past actual result file 132 received as the request data Dd this time may be displayed, or in step S211, differences between the degrees of adjusting operation indicated by the adjustment information according to the previous settings and the degrees of adjusting operation indicated by the adjustment information selected by the selecting unit 126 this time may be displayed. Thus effects similar to those of the second setting assisting section 120B can be obtained.

Other preferred modes common to the setting assisting section 120 according to the present embodiment will next be described in the following.

When the navigation device 78 is installed on the motorcycle 10 in addition to the above-described meter device 76, as shown in FIG. 2, display of adjustment information or the like by the indicating unit 128 may be made on the liquid crystal panel 74 of the meter device 76 and the display panel 80 of the navigation device 78.

Thus, it is possible to make settings for the front fork members 16 and the windshield screen 68 while referring to the adjustment information displayed on the liquid crystal panel 74 of the meter device 76. In addition, it is possible to make settings for the rear suspension 72, the rear cushion, and the like while referring to the adjustment information displayed on the display panel 80 of the navigation device 78.

As a result, the user can adjust adjusting mechanisms while referring to the adjustment information without changing the position of the user, that is, without leaving the position each time the user checks the adjustment information. Thus, adjustment time can be shortened.

Figure 16:
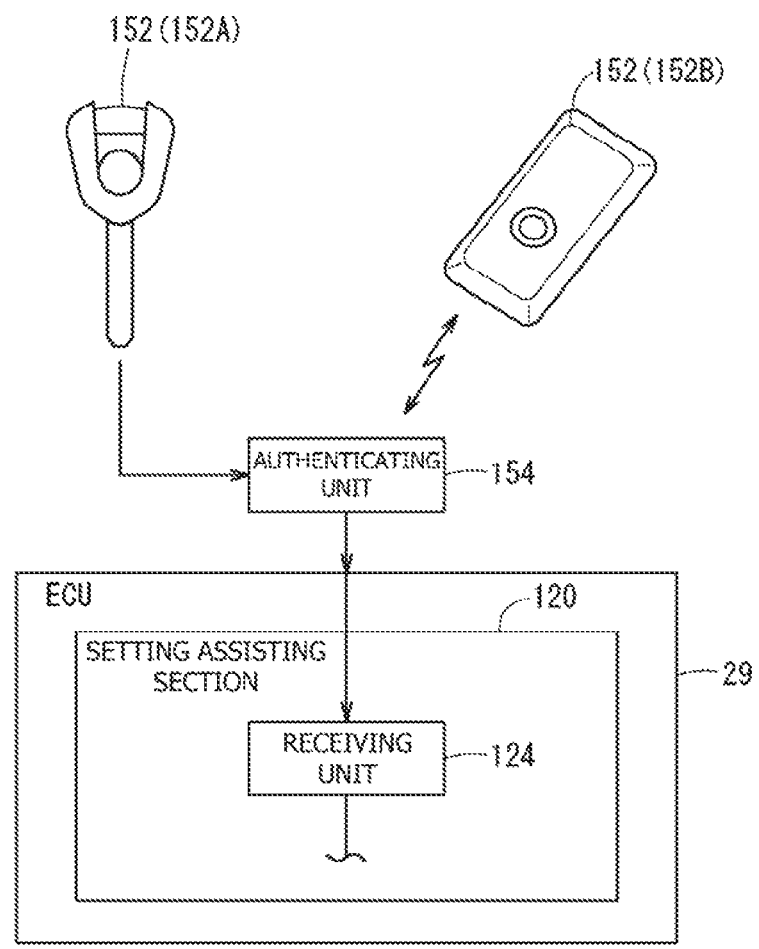
FIG. 16 is a diagram of assistance in explaining a preferred mode of the motorcycle according to the present embodiment.

(2) As shown in FIG. 16, an authenticating unit 154 is desirably provided which authenticates the motorcycle 10 and a key 152 carried by the user when the key 152 and the motorcycle 10 are within a predetermined range. The key 152 includes a mechanical key 152A, an electronic key 152B (smart key), or the like. The mechanical key 152A is inserted into a key cylinder installed for example under the handlebars 20 (see FIG. 1 and FIG. 2) of the motorcycle 10, and is rotated in a predetermined direction, thereby starting the ECU 29 and setting the motorcycle 10 in a drivable state. When the user carrying the electronic key 152B enters an area in which the electronic key 152B can communicate with the ECU 29, the authenticating unit 154 authenticates the electronic key 152B. When the electronic key 152B is authenticated as an authorized electronic key 152B, the ECU 29 is started, and the motorcycle 10 is set in a drivable state.

The receiving unit 124 of the setting assisting section 120 desirably receives a request based on input operation of the user after the authentication of the authenticating unit 154.

Thus, the authentication of the key 152 carried by the user and the motorcycle 10 makes it possible to receive only a request from the user of the motorcycle 10, and is therefore effective in preventing tampering or the like. In addition, the shutter 82 of the navigation device 78, that is, the shutter 82 openably/closably attached to the connector for a USB memory may be opened after the authentication of the authenticating unit 154. This can prevent unauthorized access to the navigation device 78 or the ECU 29.

Figure 17A:
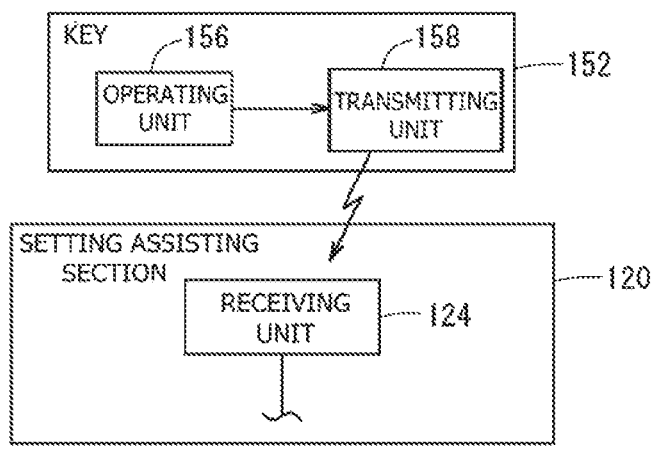
FIG. 17A is a diagram of assistance in explaining another preferred mode of the motorcycle according to the present embodiment.
Figure 17B:
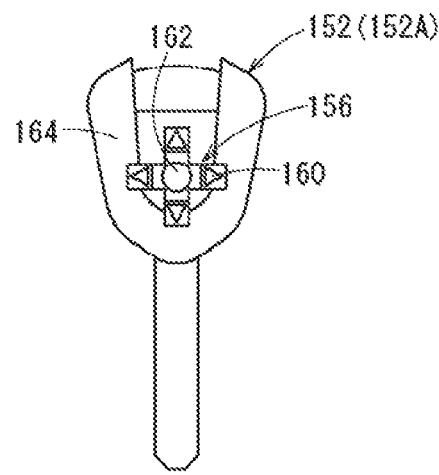
FIG. 17B is a plan view showing an example in which an operating unit is provided to the holding portion of a mechanical key.
Figure 17C:
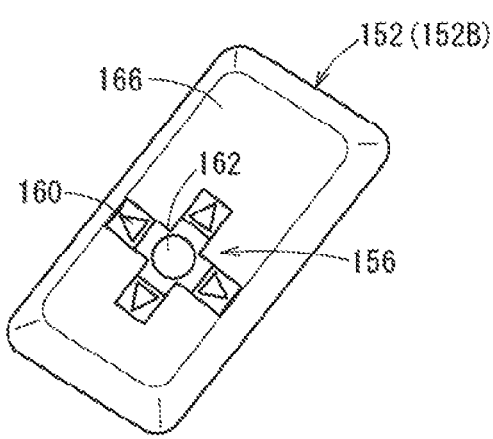
FIG. 17C is a plan view showing an example in which the operating unit is provided to the casing of an electronic key.

(3) As shown in FIG. 17A, the key 152 may include an operating unit 156 and a transmitting unit 158 that transmits a request (desire) based on an input operation on the operating unit 156 by the user to the receiving unit 124 of the motorcycle 10. As shown in FIG. 17B and FIG. 17C, the operating unit 156 includes for example a cross key 160 and an execution key 162. The user uses the operating unit 156 for the scrolling or switching of the screen displayed on the liquid crystal panel 74 of the meter device 76 or the display panel 80 of the navigation device 78, the selection of items, the checking of adjustment information, and the like. In addition, actually set degrees of adjustment are input by using the operating unit 156.

Usually, when the user inputs a request such as items or the like, the request is input by using an operating input unit (the button 136 and the switch 138 or the like) including a screen mounted on the motorcycle 10. The meter device 76 or the navigation screen mounted on the motorcycle 10 or the like may be made to serve also as the operating input unit. However, a measure such as increasing the size of a screen display region for displaying the desire or increasing operating switches, for example, may be needed. However, the provision of the operating unit 156 and the transmitting unit 158 to the key 152 carried by the user eliminates the need for increasing the size of the screen of the operating input unit of the motorcycle 10 or increasing switches.

(4) The key 152 may have tools for performing adjusting operation on adjusting mechanisms. For example, as shown in FIG. 18A and FIG. 18B, for example side surfaces of the key 152 may be provided with a first projecting portion 168a formed so as to resemble the shape of an end portion of the slotted screwdriver and a second projecting portion 168b formed so as to resemble the shape of an end portion of the hexagonal wrench. The side surfaces of the key 152 may be side surfaces of a holding portion 164 as shown in FIG. 18A or the like in the case of the mechanical key 152A, and may be side surfaces of a casing 166 as shown in FIG. 18B or the like in the case of the electronic key 152B. In addition, as shown in FIG. 18C and FIG. 18D, when the key 152 is not used as tools, the first projecting portion 168a and the second projecting portion 168b may be housed within the key 152. When the key 152 is used as tools, buttons 170a and 170b provided to the holding portion 164 or the casing 166 may be operated to expose the first projecting portion 168a and the second projecting portion 168b.

Tools are generally used in limited cases as in cases where a part or an appliance needs to be adjusted, for example, and tools are not carried at all times. Therefore, when a setting for a part such as the front fork members 16 or the like is desired to be made, a situation may occur in which the tool is not found and thus setting cannot be made. On the other hand, the key 152 is carried by the user at all times. Thus, the provision of the first projecting portion 168a and the second projecting portion 168b to the key 152 enables adjusting operation on adjusting mechanisms to be surely performed.

It is to be noted that the saddle riding type vehicle according to the present application is not limited to the foregoing embodiment, but can of course adopt various constitutions without departing from the spirit of the present application. The present application is applicable also to for example settings for fuel injection control devices, ABS control devices, and the like.

| [Description of Reference Symbols] | |
| --- | --- |
| 10 Motorcycle | 16 Front fork member |
| 22 Engine | 29 ECU (control unit) |
| 31 Vehicle body | 38 Driver seat |
| 68 Windshield screen | 72 Rear suspension |
| 74 Liquid crystal panel | 76 Meter device |
| 78 Navigation device | 80 Display panel |
| 82 Shutter | |
| 100A to 100G First to seventh adjusting mechanisms | |
| 102 Extension side adjusting unit 104 Compression side adjusting unit | |
| 106 Adjusting unit | 110 Base |
| 120 Setting assisting section | |
| 120A to 120C First to third setting assisting sections | |
| 122 Storage unit | 124 Receiving unit |
| 126 Selecting unit | 128 Indicating unit |
| 130 Preset file group | 132 Past actual result file |
| 134 Item display block | |
| 142A to 142E First to fifth display regions | |
| 144 Past information registering unit | 146 Past actual result file group |
| 148 History information registering unit | |
| 149 History display block | 150 temporary file |
| 152 Key | 152A Mechanical key |
| 152B Electronic key | 154 Authenticating unit |
| 156 Operating unit | 158 Transmitting unit |
| 168a First projecting portion | 168b Second projecting portion |
| Dd Request data | Dh History information |
| WF Front wheel | WR Rear wheel |

What is claimed is:

1. A saddle riding type vehicle, comprising:

a vehicle body;

a front wheel (WF) and a rear wheel (WR) installed in the vehicle body;

a power source (22) configured to drive at least the rear wheel (WR);

an adjusting mechanism configured to allow a user to change a setting of at least a part forming the vehicle body based on an adjustment by the adjusting mechanism;
a storage unit configured to store at least a plurality of pieces of adjustment information related to degrees of the adjustment by the adjusting mechanism;
a receiving unit configured to receive a request based on an input operation of the user;
a selecting unit configured to select adjustment information corresponding to the request received by the receiving unit, from the plurality of pieces of adjustment information in the storage unit; and
an indicating unit configured to indicate the adjustment information selected by the selecting unit to the user.

2. The saddle riding type vehicle according to claim 1, further comprising:
a past information registering unit configured to register the adjustment information related to a degree of adjusting operation by the adjusting mechanism in a past as past adjustment information in the storage unit,
wherein the indicating unit is configured to indicate, to the user, a difference (ΔD) between the degree of adjusting operation indicated by the past adjustment information and a degree of adjusting operation indicated by the adjustment information selected by the selecting unit this time.

3. The saddle riding type vehicle according to claim 1, wherein the vehicle body includes a display device configured to display information,
the saddle riding type vehicle further comprises a history information registering unit configured to associate the adjustment information selected by the selecting unit with at least date and time information, and register the adjustment information associated with the at least date and time information as history information (Δh) in the storage unit, and
the receiving unit is configured to receive the history information (Δh) as the request based on a selection of the history information (Δh) displayed on the display device by the user via the input operation.

4. The saddle riding type vehicle according to claim 1, wherein the vehicle body includes a display device configured to display information,
the receiving unit includes an item display block configured to display an item related to a change in a set state of the part forming the vehicle body on the display device, and
the receiving unit is configured to receive the item as the request based on a selection of the item displayed on the display device by the user via the input operation.

5. The saddle riding type vehicle according to claim 1, further comprising:
an authenticating unit configured to authenticate the saddle riding type vehicle and a key carried by the user based on a determination that the key and the saddle riding type vehicle are within a range,
wherein the receiving unit is configured to receive the request based on the input operation of the user after the authentication of the authenticating unit.

6. The saddle riding type vehicle according to claim 5, wherein the key includes an operating unit and a transmitting unit configured to transmit a desire based on an input operation on the operating unit by the user to the receiving unit.

7. The saddle riding type vehicle according to claim 5, wherein the key includes a tool provided for the adjustment by the adjusting mechanism.

8. The saddle riding type vehicle according to claim 2, wherein the vehicle body includes a display device configured to display information,
the receiving unit includes an item display block configured to display an item related to a change in a set state of the part forming the vehicle body on the display device, and
the receiving unit is configured to receive the item as the request based on a selection of the item displayed on the display device by the user via the input operation.

9. The saddle riding type vehicle according to claim 3, wherein the vehicle body includes a display device configured to display information,
the receiving unit includes an item display block configured to display an item related to a change in a set state of the part forming the vehicle body on the display device, and
the receiving unit is configured to receive the item as the request based on a selection of the item displayed on the display device by the user via the input operation.

10. The saddle riding type vehicle according to claim 2, further comprising:
an authenticating unit configured to authenticate the saddle riding type vehicle and a key carried by the user based on a determination that the key and the saddle riding type vehicle are within a range,
wherein the receiving unit is configured to receive the request based on the input operation of the user after the authentication of the authenticating unit.

11. The saddle riding type vehicle according to claim 3, further comprising:
an authenticating unit configured to authenticate the saddle riding type vehicle and a key carried by the user based on a determination that the key and the saddle riding type vehicle are within a range,
wherein the receiving unit is configured to receive the request based on the input operation of the user after the authentication of the authenticating unit.

12. The saddle riding type vehicle according to claim 4, further comprising:
an authenticating unit configured to authenticate the saddle riding type vehicle and a key carried by the user based on a determination that the key and the saddle riding type vehicle are within a range,
wherein the receiving unit is configured to receive the request based on the input operation of the user after the authentication of the authenticating unit.

13. The saddle riding type vehicle according to claim 6, wherein the key includes a tool provided for the adjustment by the adjusting mechanism.

14. A saddle riding type vehicle, comprising:
a vehicle body;
a front wheel (WF) and a rear wheel (WR) installed in the vehicle body;
a power source (22) configured to drive at least the rear wheel (WR);
an adjusting mechanism configured to allow a user to change a setting of at least a part that forms the vehicle body based on a first adjustment by the adjusting mechanism;
a storage unit configured to store at least a plurality of pieces of adjustment information related to degrees of the first adjustment by the adjusting mechanism;

a receiving unit configured to receive a request based on an input operation of the user;

a selecting unit configured to select adjustment information, corresponding to the request received by the receiving unit, from the plurality of pieces of adjustment information in the storage unit; and an indicating unit configured to indicate, to the user, a difference ($\Delta D$) between a degree of a second adjustment by the adjusting mechanism in past and a degree of the first adjustment indicated by the adjustment information selected by the selecting unit.

* * * * *